US012208457B2

(12) United States Patent
Thackery et al.

(10) Patent No.: US 12,208,457 B2
(45) Date of Patent: Jan. 28, 2025

(54) CIRCULAR SAW

(71) Applicant: TECHTRONIC CORDLESS GP, Anderson, SC (US)

(72) Inventors: Clinton C. Thackery, Clemson, SC (US); Douglas K. Ritterling, Anderson, SC (US); Ronald C. McCurry, West Union, SC (US); Brian D. Mertel, Simpsonville, SC (US); M. Grayson Jacoway, Mauldin, SC (US)

(73) Assignee: Techtronic Cordless GP, Anderson, SC (US)

(*) Notice: Subject to any disclaimer, the term of this patent is extended or adjusted under 35 U.S.C. 154(b) by 441 days.

(21) Appl. No.: 17/128,354

(22) Filed: Dec. 21, 2020

(65) Prior Publication Data

US 2021/0205905 A1 Jul. 8, 2021

Related U.S. Application Data

(60) Provisional application No. 62/956,420, filed on Jan. 2, 2020.

(51) Int. Cl.
*B23D 45/16* (2006.01)
(52) U.S. Cl.
CPC .................. *B23D 45/16* (2013.01)
(58) Field of Classification Search
CPC ............ B23D 45/16; B27B 9/02; B27G 19/04
See application file for complete search history.

(56) References Cited

U.S. PATENT DOCUMENTS

| D313,155 S | 12/1990 | Somers |
| 4,982,501 A | 1/1991 | Sauerwein et al. |
| D315,854 S | 4/1991 | Kawakami et al. |

(Continued)

FOREIGN PATENT DOCUMENTS

| CN | 201102267 Y | * 9/2007 | ............... B27B 9/02 |
| CN | 100448635 C | 1/2009 | |

(Continued)

OTHER PUBLICATIONS

Tool Boss, "Hart 20v 6 ½" Circular Saw Unboxing and Review," <https://www.youtube.com/watch?v=a2dyMTJ5yF4> video dated Nov. 23, 2019.

(Continued)

*Primary Examiner* — Jonathan G Riley
(74) *Attorney, Agent, or Firm* — Michael Best & Friedrich LLP (57) ABSTRACT

A circular saw includes a base with an opening therethrough, a blade guard coupled to the base, and a saw blade at least partially positioned within the blade guard and extending through the opening of the base. The saw blade and the blade guard are pivotable relative to the base to adjust a bevel angle of the saw blade relative to the base. The circular saw also includes a housing supported by the blade guard, a motor positioned within the housing that is operable to rotate the saw blade, and a bevel angle guide coupled between the base and the blade guard. The bevel angle guide configured to indicate the bevel angle at which the saw blade is adjusted. The bevel angle guide is integrally formed with the base as a single piece.

5 Claims, 7 Drawing Sheets

(56) References Cited

U.S. PATENT DOCUMENTS

| | | | |
|---|---|---|---|
| 5,010,651 A * | 4/1991 | Techter | B27B 9/02 30/375 |
| 5,070,562 A * | 12/1991 | Lentino | B25F 1/00 7/164 |
| D326,399 S | 5/1992 | Fushiya et al. | |
| D327,828 S | 7/1992 | Hoshino et al. | |
| D334,523 S | 4/1993 | Hoshino et al. | |
| D390,081 S | 2/1998 | Price et al. | |
| D400,772 S | 11/1998 | Gallagher et al. | |
| 5,924,207 A | 7/1999 | Price et al. | |
| 6,055,734 A | 5/2000 | McCurry et al. | |
| D427,872 S | 7/2000 | Snider | |
| D429,133 S | 8/2000 | Lui | |
| 6,301,789 B1 | 10/2001 | Zeiler et al. | |
| 6,543,143 B2 | 4/2003 | Moore et al. | |
| D474,952 S | 5/2003 | Andriolo | |
| D475,265 S | 6/2003 | Hatch et al. | |
| D486,369 S | 2/2004 | Keller | |
| 6,688,004 B2 | 2/2004 | Havenstein et al. | |
| D488,977 S | 4/2004 | Evans | |
| D499,001 S | 11/2004 | Wu | |
| D500,438 S | 1/2005 | Andriolo | |
| D501,777 S | 2/2005 | Wu | |
| D502,073 S | 2/2005 | Andriolo | |
| D502,074 S | 2/2005 | Sham et al. | |
| D502,373 S | 3/2005 | Wu | |
| D507,949 S | 8/2005 | Chunn et al. | |
| D509,118 S | 9/2005 | Schoen | |
| D520,830 S | 5/2006 | Suzuki et al. | |
| D520,831 S | 5/2006 | Okada et al. | |
| D521,836 S | 5/2006 | Hastie | |
| D522,336 S | 6/2006 | Waldron | |
| D522,831 S | 6/2006 | Andriolo | |
| D522,832 S | 6/2006 | Hastie | |
| D525,503 S | 7/2006 | Waldron | |
| D525,504 S | 7/2006 | Corcoran | |
| 7,073,266 B2 | 7/2006 | Moore et al. | |
| D539,108 S | 3/2007 | Roberts | |
| D539,626 S | 4/2007 | Roberts | |
| 7,219,434 B2 | 5/2007 | Moore et al. | |
| 7,275,326 B2 | 10/2007 | Tanimoto et al. | |
| D578,853 S | 10/2008 | Gallagher et al. | |
| 7,661,194 B1 * | 2/2010 | Ende | B27B 9/02 83/761 |
| 7,861,417 B2 | 1/2011 | Tanimoto et al. | |
| D638,681 S | 5/2011 | Yamada et al. | |
| 7,950,156 B2 | 5/2011 | Nickels, Jr. et al. | |
| 8,245,408 B2 | 8/2012 | Nickels, Jr. et al. | |
| 8,272,133 B2 | 9/2012 | Wascow | |
| D685,243 S | 7/2013 | Waldron | |
| 8,522,656 B2 | 9/2013 | Kani et al. | |
| 8,677,634 B2 | 3/2014 | Nickels, Jr. et al. | |
| 8,776,384 B2 | 7/2014 | Hartmann | |
| 9,242,390 B2 | 1/2016 | Nicholson | |
| D756,738 S | 5/2016 | Itoh | |
| 9,333,638 B2 * | 5/2016 | Powell | B25F 5/021 |
| 9,522,479 B2 | 12/2016 | Boehme et al. | |
| 9,527,143 B2 | 12/2016 | Moreno | |
| 9,623,583 B2 | 4/2017 | Sinzig et al. | |
| D790,304 S | 6/2017 | Waldron | |
| D790,305 S | 6/2017 | Waldron | |
| D790,306 S | 6/2017 | Waldron | |
| D820,655 S | 6/2018 | Waldron | |
| 10,071,498 B2 | 9/2018 | Holba | |
| D829,523 S | 10/2018 | Kosugi et al. | |
| 10,173,341 B2 | 1/2019 | Holba | |
| D849,495 S | 5/2019 | Taniguchi et al. | |
| D860,272 S | 9/2019 | Conley | |
| D860,745 S | 9/2019 | Turner et al. | |
| D861,451 S | 10/2019 | Wang | |
| D861,452 S | 10/2019 | Cooper et al. | |
| D862,187 S | 10/2019 | Borras Marques | |
| D863,917 S | 10/2019 | Yang | |
| D863,918 S | 10/2019 | Takahashi et al. | |
| D883,056 S | 5/2020 | Turner | |
| D915,852 S | 4/2021 | Yin | |
| D919,395 S | 5/2021 | Knowles et al. | |
| 2006/0156887 A1 * | 7/2006 | Hutchings | B23D 47/126 83/581 |
| 2007/0107235 A1 | 5/2007 | Mok | |
| 2009/0126206 A1 | 5/2009 | Chung et al. | |
| 2010/0116112 A1 | 5/2010 | Fukuoka et al. | |
| 2010/0236370 A1 | 9/2010 | Hassenboehler, Jr. | |
| 2011/0252652 A1 | 10/2011 | Zhen et al. | |
| 2015/0174719 A1 | 6/2015 | Matsumoto | |
| 2015/0328796 A1 | 11/2015 | Okouchi et al. | |
| 2016/0176064 A1 | 6/2016 | Okouchi et al. | |
| 2017/0173814 A1 | 6/2017 | Baxivanelis | |
| 2018/0169885 A1 | 6/2018 | Okouchi | |
| 2019/0143555 A1 | 5/2019 | Nakashima | |
| 2020/0376705 A1 | 12/2020 | Fukinuki et al. | |

FOREIGN PATENT DOCUMENTS

| | | |
|---|---|---|
| CN | 202398893 U | 8/2012 |
| CN | 103752943 A | 4/2014 |
| EP | 2484473 A1 | 8/2012 |
| EP | 2762282 A1 | 8/2014 |
| WO | 2019063686 A1 | 4/2019 |

OTHER PUBLICATIONS

Extended European Search Report for Application No. 20216983.5 dated May 31, 2021 (10 pages).

* cited by examiner

CIRCULAR SAW

CROSS REFERENCE TO RELATED APPLICATION

This application claims the benefit of U.S. Provisional Patent Application No. 62/956,420, filed on Jan. 2, 2020, the entire content of which is incorporated herein by reference.

FIELD OF THE DISCLOSURE

The present disclosure relates to power tools and, more particularly, to circular saws.

BACKGROUND OF THE DISCLOSURE

Generally, circular saw include blades specifically to cut work pieces made of a variety of materials, such as, for example, metals, fiber, or wood.

SUMMARY OF THE DISCLOSURE

The present disclosure provides, in one aspect, a circular saw including a base with an opening therethrough, a blade guard coupled to the base, and a saw blade at least partially positioned within the blade guard and extending through the opening of the base. The saw blade and the blade guard are pivotable relative to the base to adjust a bevel angle of the saw blade relative to the base. The circular saw also includes a housing supported by the blade guard, a motor positioned within the housing that is operable to rotate the saw blade, and a bevel angle guide coupled between the base and the blade guard. The bevel angle guide configured to indicate the bevel angle at which the saw blade is adjusted. The bevel angle guide is integrally formed with the base as a single piece.

The present disclosure provides, in another aspect, a method of manufacturing a circular saw. The method includes providing a base having a flat bottom surface configured to slide atop a workpiece, punching a first portion of the base to create an opening therethrough, perforating a second portion of the base adjacent the first portion, and bending the perforated second portion of the base away from the flat bottom surface until the perforated second portion of the base reaches a perpendicular orientation relative to the flat bottom surface.

The present disclosure provides, in another aspect, a circular saw including a base with a first opening therethrough, a blade guard coupled to the base, and a saw blade at least partially positioned within the blade guard and extending through the first opening. The saw blade and the blade guard are pivotable relative to the base to adjust a cutting depth of the saw blade relative to the base. The circular saw also includes a housing supported by the blade guard, a motor positioned within the housing that is operable to rotate the saw blade about a rotational axis, a cutting depth guide coupled to the base and positioned adjacent the blade guard, and a battery receptacle configured to receive a battery pack for providing power to the motor. The battery receptacle is spaced from the housing to define a second opening therebetween for viewing the cutting depth guide along a line of sight that is parallel with the rotational axis.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. In addition, as used herein, the terms "upper", "lower", and other directional terms are not intended to require any particular orientation, but are instead used for purposes of description only.

DETAILED DESCRIPTION

Figure 1:
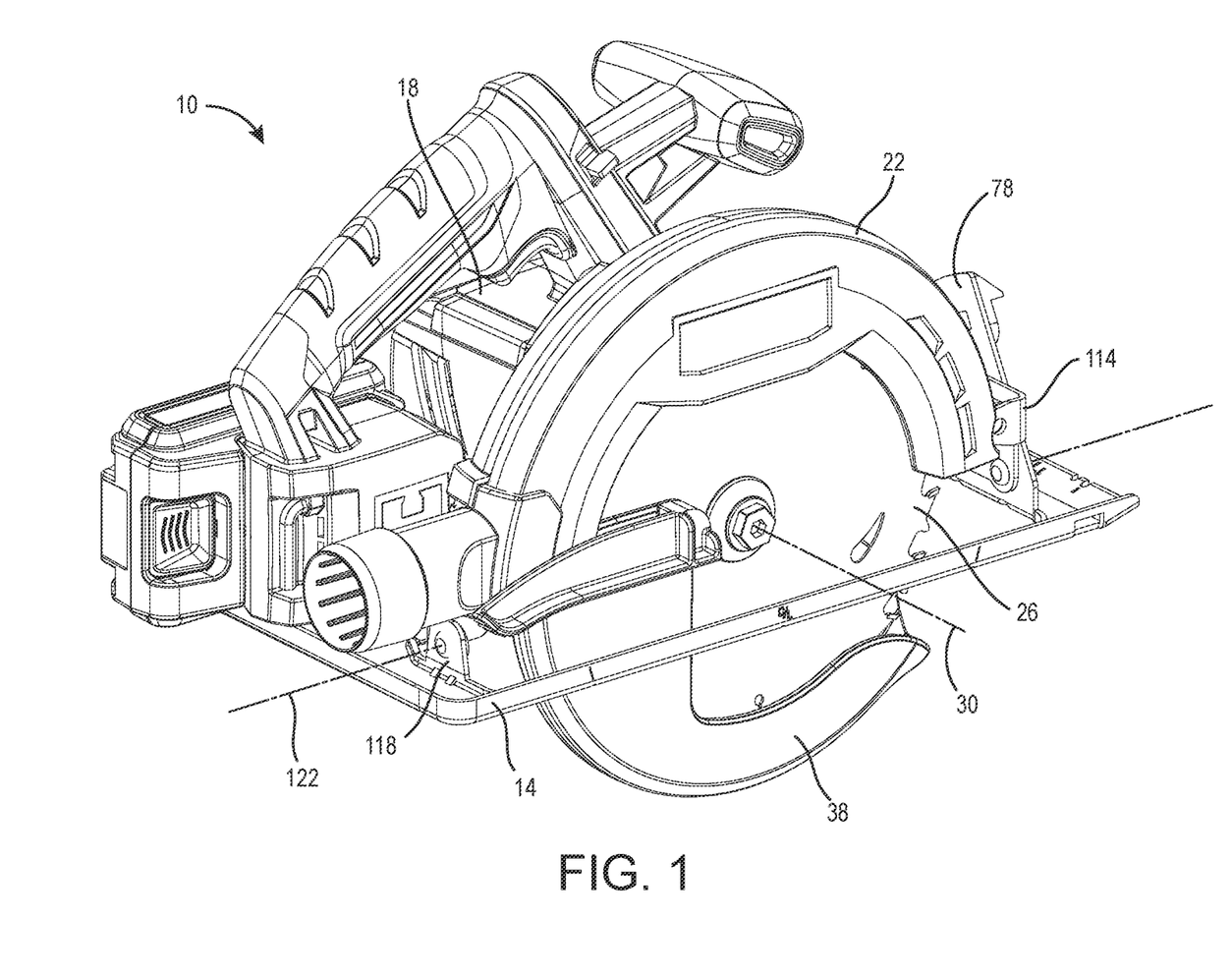
FIG. 1 is a rear perspective view of an embodiment of a circular saw according to the present disclosure.
Figure 2:
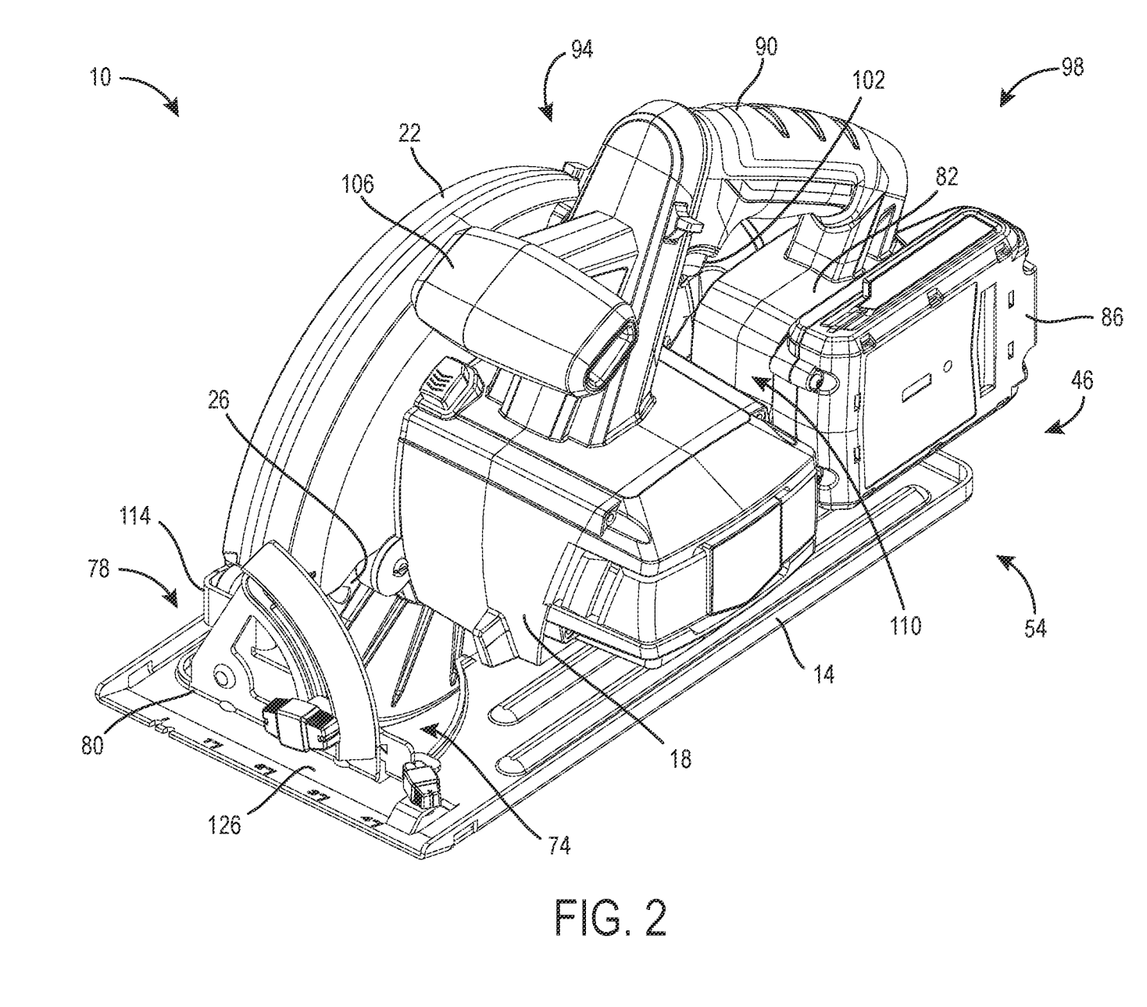
FIG. 2 is a front perspective view of the circular saw of FIG. 1.

FIGS. 1 and 2 illustrate a circular saw 10 including a base 14, a housing 18 supported by the base 14, an electric motor (not shown) positioned within the housing 18, an upper blade guard 22 adjacent the housing 18, and a saw blade 26 (FIG. 1) at least partially positioned within the upper blade guard 22 and rotatable by the motor to cut a workpiece. In some embodiments, the motor may be a brushless motor. The motor is operable to rotate the saw blade 26 about an axis of rotation 30 that extends centrally through the saw blade 26.

Figure 3:
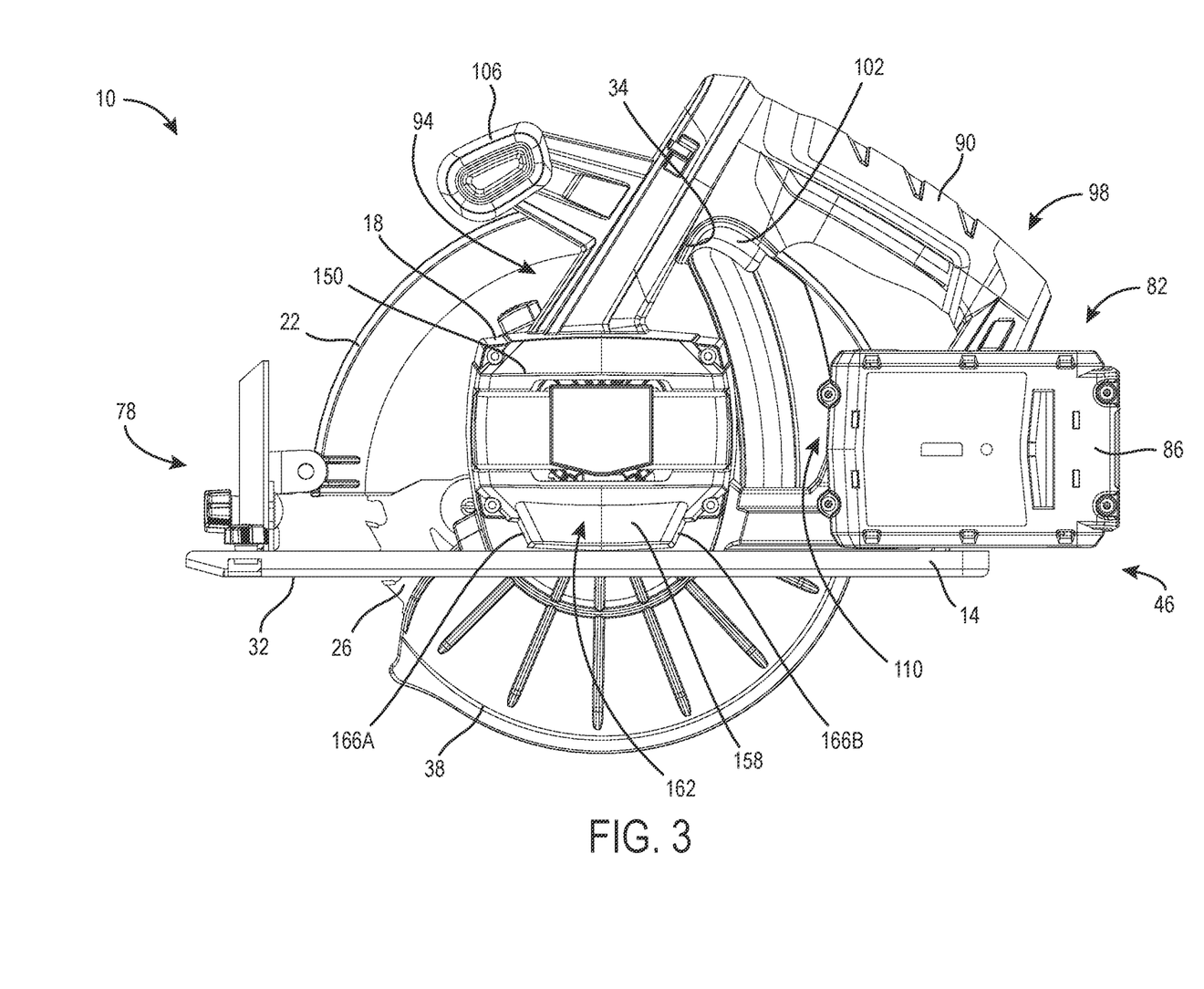
FIG. 3 is a side view of the circular saw of FIG. 1.

The base 14 (e.g., a shoe) is coupled to the upper blade guard 22 for supporting the circular saw 10 on a workpiece. The base 14 separates an upper portion of the saw blade 26 from a lower portion, and includes a smooth bottom surface 32 (FIG. 3) against which a surface of the workpiece is slidable as the saw blade 26 cuts the workpiece. The base 14 is pivotable with respect to the upper blade guard 22 about a first pivot axis 138 (FIG. 4) that is parallel with the bottom surface 32 of the base 14 in order to adjust the cutting depth of the saw blade 26 (FIG. 3). The circular saw 10 includes a cutting depth guide 34, a lower end of which is attached to the base 14, positioned adjacent the upper blade guard 22 to indicate to a user the distance below the base 14 the saw blade 26 extends, as described in more detail below. The base 14 may also be pivotable with respect to the upper blade guard 22 about a second pivot axis 122 (FIG. 1) that is parallel with the bottom surface 32 of the base 14 in order to adjust the bevel angle of the saw blade 26. The circular saw 10 therefore includes a bevel angle guide 78 to indicate to a user the bevel angle of the saw blade 26 relative to a workpiece.

Figure 4:
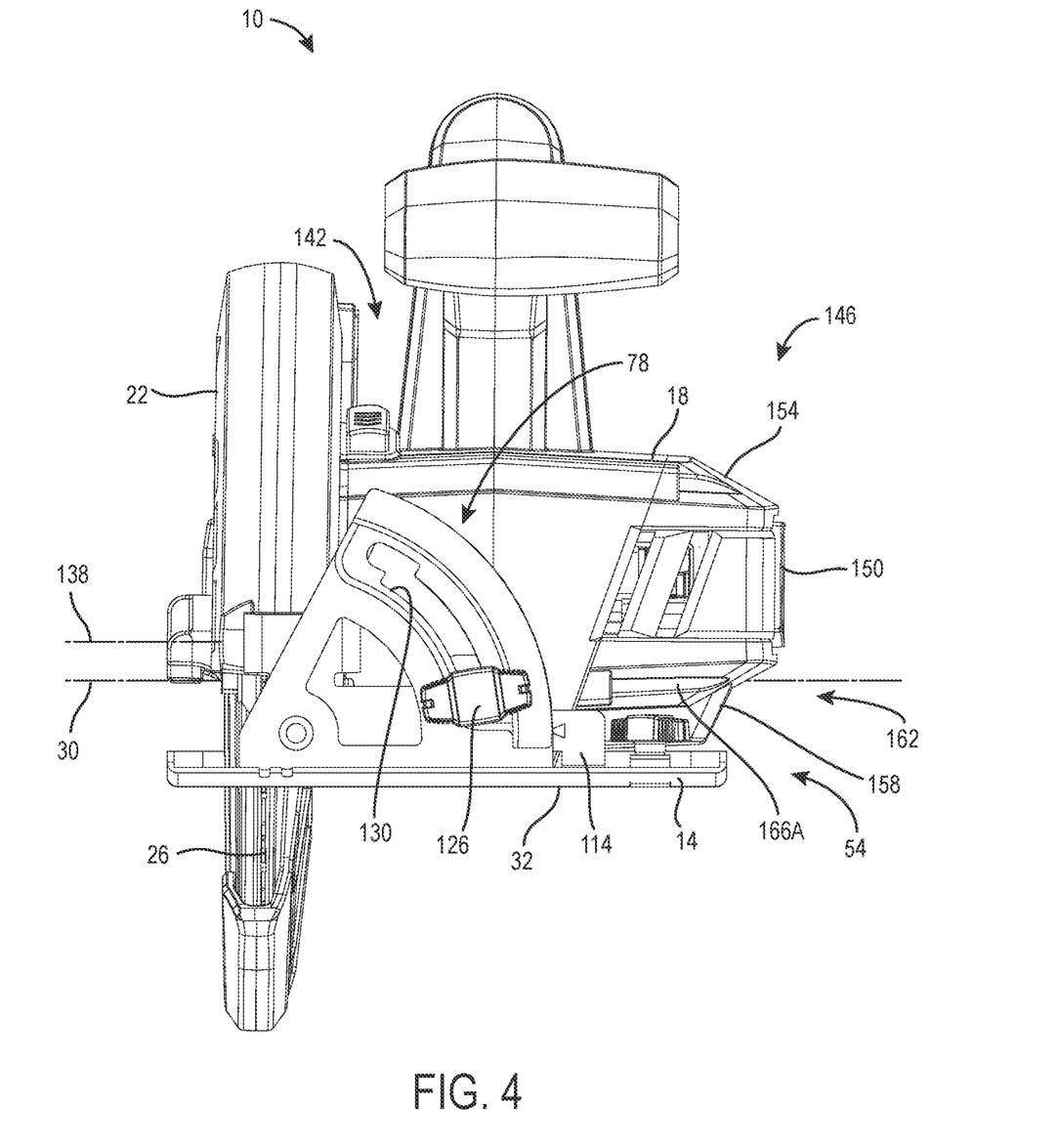
FIG. 4 is a front view of the circular saw of FIG. 1.

Referring to FIG. 1, the housing 18, the upper blade guard 22, and the saw blade 26 may each be supported on the base 14 by one or more brackets (e.g., a first front bracket 114 and a second rear bracket 118). The first bracket 114 may be coupled to the bevel angle guide 78 and the second bracket 118 may be directly coupled to the base 14. The second pivot axis 122 extends through the first and second brackets 114, 118. The first bracket 114 is pivotable with the housing 18 and upper blade guard 22 to a desired bevel angle relative to the base 14. As such, the housing 18, the upper blade guard 22 and, thus, the saw blade 26 may be pivoted relative to the base 14 to an angle between 0 degrees (e.g., where the base 14 and saw blade 26 are perpendicular) and 45 degrees. With reference to FIG. 4, the first bracket 114 further includes an actuator 126 (e.g., a knob) that extends through an arcuate slot 130 of the bevel angle guide 78. The actuator 126 may be rotated a first direction (e.g., clockwise) to clamp the first bracket 114 to the bevel angle guide 78, and therefore secure the saw blade 26 at a specific bevel angle relative to the base 14. Alternatively, the actuator 126 may be rotated a second direction (e.g., counter-clockwise) to loosen the clamping force between the first bracket 114 and the bevel angle guide 78, allowing the bevel angle of the saw blade 26 to be adjusted relative to the base 14.

The first bracket 114 further defines the first pivot axis 138 (FIG. 4) on which the housing 18 and the upper blade guard 22 may be pivotable to adjust the depth of cut of the saw blade 26. The upper blade guard 22 may be pivotable relative to the base 14 to adjust the distance the saw blade 26 extends beneath the base 14. Although not shown, the cutting depth guide 34 may include an actuator that allows a user to set the depth of the saw blade 26 for a cutting operation. Alternatively, the actuator may be a depth stop limiter that allows a user to preset the distance the saw blade 26 extends beneath the base 14 during a plunge cut. As such, the cutting depth guide 34 may include a scale to indicate to a user the depth of cut of the saw blade 26.

The circular saw 10 further includes a lower blade guard 38 pivotably attached to the upper blade guard 22 to selectively cover the lower portion of the saw blade 26 below the base 14 so that, at most, only a small portion of the front of the saw blade 26 is exposed when the saw 10 is not in use. During a cutting operation, the lower blade guard 38 engages the workpiece, and forward displacement of the circular saw 10 causes the lower blade guard 38 to pivot to expose more of the saw blade 26 to cut the workpiece.

Figure 5:
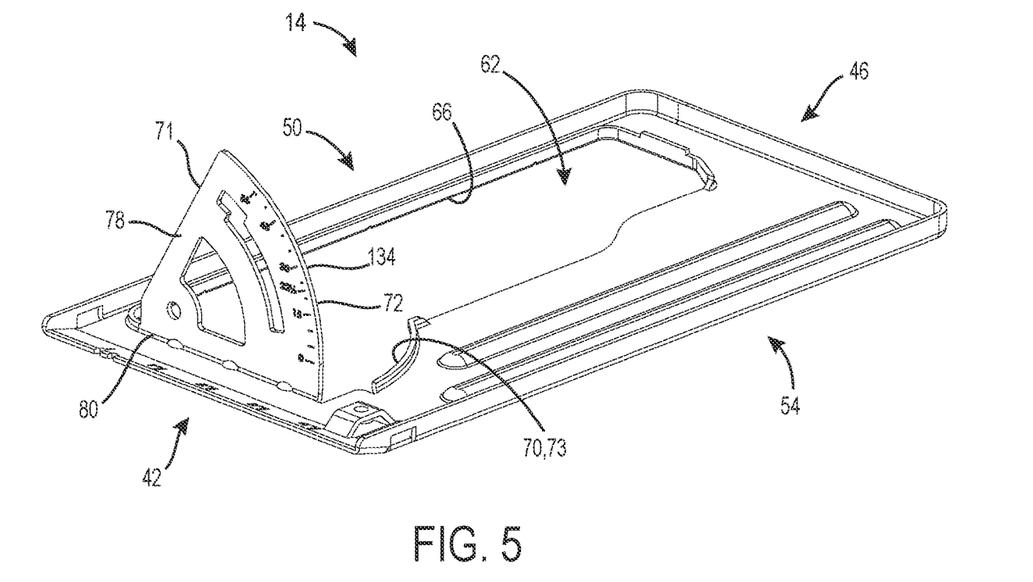
FIG. 5 is a perspective view of a base of the circular saw of FIG. 1.
Figure 6:
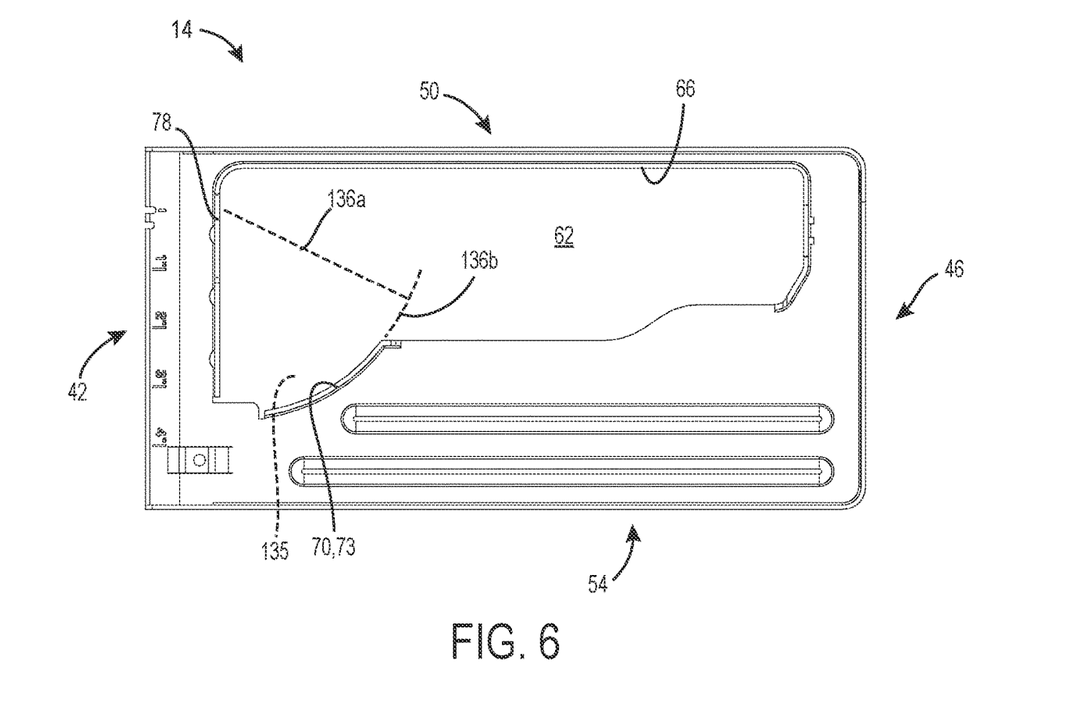
FIG. 6 is a top view of the base of FIG. 5.

With reference to FIGS. 5 and 6, the base 14 includes a front end 42, a rear end 46 opposite the front end 42, a first side 50, a second side 54 opposite the first side 50, and the bevel angle guide 78, which is integrally formed with the base 14 as a single piece. The base 14 defines an opening 62 having a first portion 66 and a contiguous second portion 70. The saw blade 26 extends through the first portion 66 of the opening 62. The bevel angle guide 78 includes a straight edge 71 and an adjacent arcuate edge 72. The second portion 70 of the opening 62 is partially defined by an arcuate edge 73 on the base 14 corresponding to a shape of the arcuate edge 72 of the bevel angle guide 78. In other words, the second portion 70 of the opening 62 may be similar in size and shape to the bevel angle guide 78. The second portion 70 of the opening 62 defines a viewing window 74 (FIG. 2) that allows the user to view the saw blade 26 and the workpiece during a cutting operation. The opening 62 is substantially larger than openings for other circular saws. Specifically, the second portion 70 increases the area of the viewing window 74 for a user to see the saw blade 26 engage a workpiece. For example, the opening 62, including the first and second portions 66, 70, may occupy between 35% and 55% of the total area of the base 14. In other embodiments, the opening 62 may occupy less than 35% or more than 55% of the total area of the base 14. In further embodiments, the opening 62 occupies at least 40% of the total area of the base 14. In this way, the viewing window 74 provides an increased area for a user to view the saw blade 26 engage a workpiece.

With reference to FIG. 5, the bevel angle guide 78 is substantially orthogonal to an upper surface of the base 14 and is connected to the upper surface of the base 14 by a bent edge 80. In the illustrated embodiment, the bent edge 80 is contiguous with both the base 14 and the bevel angle guide 78, and is formed during a bending process when manufacturing the base 14, as described in further detail below. The bent edge 80 is oriented on the base 14 in a direction parallel with the axis of rotation 30. The bent edge 80 is also proximate to and parallel with the front end 42 of the base 14.

The bent edge 80 is formed by bending the bevel angle guide 78 from a first orientation, in which the bevel angle guide 78 is parallel or co planar with the base 14, to a second orientation, in which the bevel angle guide 78 is perpendicular or orthogonal to the base 14. As such, the bevel angle guide 78 occupies the second portion 70 of the opening 62 when in the first orientation. Similarly, the second portion 70 of the opening 62 is defined by the arcuate edge 73 on the base 14, which corresponds to the shape of the arcuate edge 72 of the bevel angle guide 78 when in the first orientation. The bevel angle guide 78 may further include a scale 134 (FIG. 5) to indicate to a user the bevel angle of the circular saw 10.

The base 14 of the circular saw 10 may be manufactured from a flat piece of material (e.g., metal). A stamping operation may first create the perimeter of the base 14, and then subsequent pressing operations may bend the ends 42, 46 and sides 50, 54 of the base 14 upward and away from the bottom surface 32. A first interior portion of the base 14 may be punched to create the first portion 66 of the opening 62. A second interior portion 135 (that will eventually become the bevel angle guide 78) adjacent the first portion 66 of opening 62 is then perforated along lines 136a, 136b that will eventually become the straight edge 71 and an adjacent arcuate edge 72. The second interior portion 135 of the base 14, now bounded by the perforated lines 136a, 136b that will eventually become the straight edge 71 and the adjacent arcuate edge 72, is then bent away from the flat bottom surface 32 of the base 14 until the bevel angle guide 78 reaches a perpendicular orientation relative to the flat bottom surface 32 of the base 14. The step of bending the second interior portion 135 of the base 14 to create the bevel angle guide 78 thereby creates the bent edge 80. In this way, the ease of manufacture may be improved, and likewise, the manufacture and cost of extra materials that would otherwise be required to form a separate angle guide that is not a portion of the base 14 may be saved.

Referring to FIG. 4, the housing 18 includes a first end 142 adjacent the upper blade guard 22 and a second end 146 opposite the first end 142. The axis of rotation 30 of the saw blade 26 extends between the first and second ends 142, 146 of the housing 18. A motor cover 150 is disposed at the second end 146 to protect the motor. The motor cover 150 includes an upper portion 154 and a bottom portion 158. The upper portion 154 extends over the second side 54 of the base 14. The bottom portion 158 of the motor cover 150 recedes from the upper portion 154 along the axis of rotation 30 to define a recess 162 beneath the upper portion 154. The recess 162 is partially defined over the base 14 and extends over the second side 54 of the base 14. The bottom portion 158 of the motor cover 150 is defined by two tapered sides 166A, 166B (FIG. 3). The recess 162 provides a clearance beneath the housing 18 (including the motor cover 150) so that a straight edge (e.g., another workpiece) may be positioned within the recess 162 for guiding the saw 10 along a straight line during a cutting operation. In this way, both the ease of cutting a workpiece and the quality of cut (e.g., a straighter cut) may be improved.

With reference to FIGS. 2 and 3, the circular saw 10 further includes a battery receptacle 82 that is separated from the housing 18. In other words, the battery receptacle 82 is positioned more proximate the rear end 46 of the base 14 than the housing 18. The battery receptacle 82 receives a battery pack 86 to power the motor. The illustrated battery pack 86 may be a power tool battery pack having a plurality of rechargeable battery cells. The battery cells may be lithium-based or have any other suitable chemistry. The circular saw 10 further includes a first handle 90. The first handle 90 includes a first end 94 that is coupled to the housing 18 and a second end 98 coupled to the battery receptacle 82. In other words, the first handle 90 interconnects the housing 18 and the battery receptacle 82. The first handle 90 further includes a trigger 102 that may be depressed to energize the motor and rotate the saw blade 26. A second handle 106 extends from the first end 94 of the first handle 90. As such, a user may place one hand on the first handle 90 and the other hand on the second handle 106 to control the circular saw 10 during a cutting operation.

An opening or viewing window 110 is defined between the housing 18, the battery receptacle 82, the base 14, and the first handle 90 (see also FIG. 3). The viewing window 110 allows a user to view the cutting depth guide 34 along a line of sight that is parallel to the axis of rotation 30 from the second side 54 of the base 14. The viewing window 110 allows a user to view a substantial portion of the cutting depth guide 34. In other words, more than half of the cutting depth guide 34 may be viewed through the viewing window 110. In other embodiments, a greater portion of the cutting depth guide 34 may be viewed through the viewing window 110.

Figure 7:
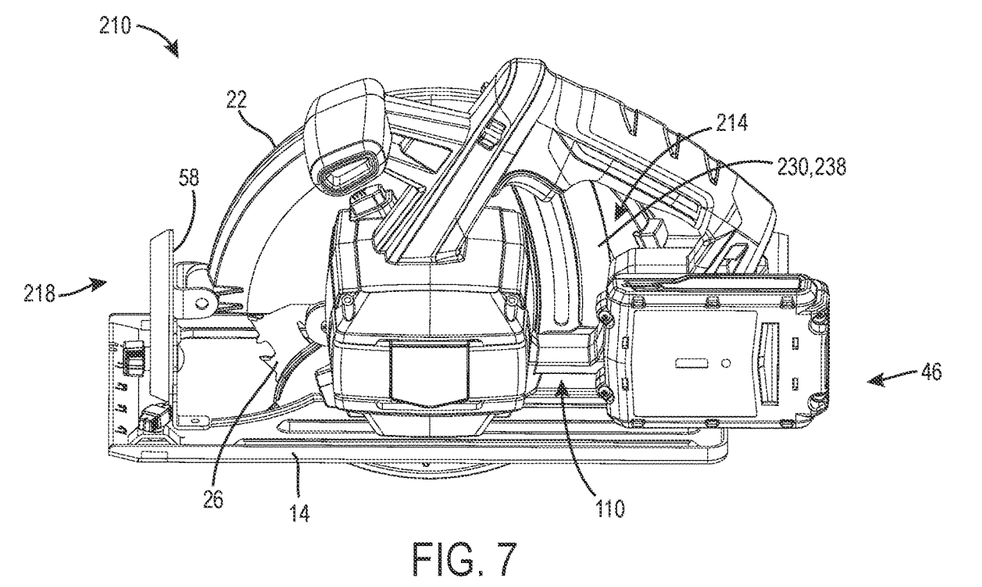
FIG. 7 is a side perspective of a circular saw according to another embodiment of the present disclosure.
Figure 8:
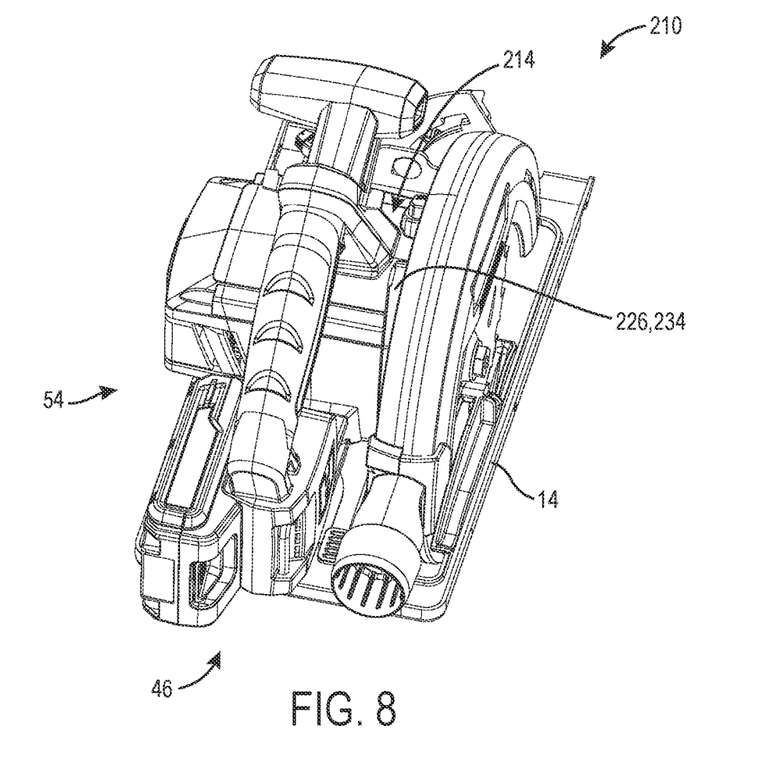
FIG. 8 is a rear perspective view of the circular saw of FIG. 6.
Figure 9:
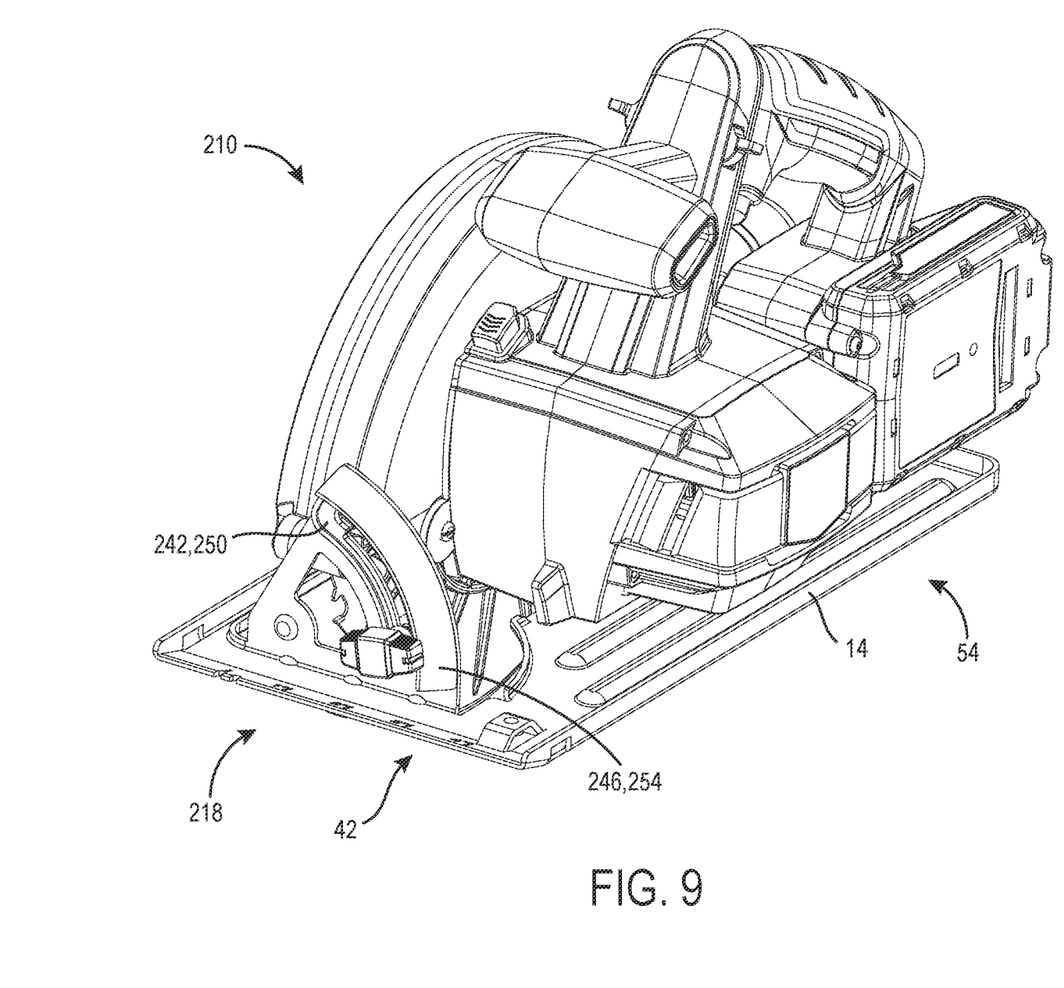
FIG. 9 is a front perspective view of the circular saw of FIG. 6.

FIGS. 7-9 illustrate a circular saw 210 according to another embodiment of the disclosure. The circular saw 210 is similar to the circular saw 10 described above with like features being identified by reference numerals. The circular saw 210 includes a cutting depth guide 214 having a first surface 226 (FIG. 8) that faces the rear end 46 of the base 14 and a second surface 230 that faces the second side 54 of the base 14 of the circular saw 210. The first and second surfaces 226, 230 include first and second scales 234, 238, respectively, that indicate to a user a distance the saw blade 26 will extend below the base 14 during a plunge cut operation. In the illustrated embodiment, the first and second surfaces 226, 230 may be perpendicular or orthogonal to each other so that a user may view the first scale 234 from the rear end 46 of the base 14 or the second scale 238 from the second side 54 of the base 14 and through the window 110. The first scale 234 may be viewed through an opening between the first handle 90 and the upper blade guard 22 from a line of sight that is perpendicular to the axis of rotation 30. In other embodiments, the first and second surfaces 226, 230 may be oblique relative to each other so that a user may view the first scale 234 from a first direction or the second scale 238 from a second direction that is different than the first direction. The first and second scales 234, 238 are identical to one another, such that the user may view either to set the cutting depth of the saw blade 26.

With reference to FIG. 9, similar to the cutting depth guide 214, the bevel angle guide 218 includes a first surface 242 that faces the front end 42 of the base 14 and a second surface 246 that faces the second side 54 of the base 14. The first and second surfaces 242, 246 include first and second scales 250, 254, respectively, that indicate to a user the bevel angle of the saw blade 26 for a cutting operation. In the illustrated embodiment, the first and second surfaces 242, 246 may be orthogonal to each other so that a user may view the first scale 250 from the front end 42 of the base 14 or view the second scale 254 from the second side 54 of the base 14. In other embodiments, the first and second surfaces 242, 246 may be oblique relative to each other so that a user may view the first scale 250 from a first direction or the second scale 254 from a second direction that is different than the first direction. The first and second scales 250, 254 are identical, such that the user may view either to set the bevel angle of the saw blade 26.

Various features of the invention are set forth in the following claims.

What is claimed is:

1. A circular saw comprising:
a base including an opening therethrough;
a blade guard coupled to the base;
a saw blade at least partially positioned within the blade guard and extending through the opening of the base, the saw blade and the blade guard pivotable relative to the base to adjust a bevel angle of the saw blade relative to the base;
a housing supported by the blade guard;
a motor positioned within the housing, the motor operable to rotate the saw blade;
a bevel angle guide coupled between the base and the blade guard, the bevel angle guide configured to indicate the bevel angle at which the saw blade is adjusted; and
a bent edge between the base and the bevel angle guide, wherein the bent edge is contiguous with both the base and the bevel angle guide;
wherein the bevel angle guide is integrally formed with the base as a single piece;
wherein the opening defines a first portion through which the saw blade extends and a contiguous second portion;
wherein the bent edge between the base and the bevel angle guide is formed by bending the bevel angle guide from a first orientation, in which the bevel angle guide is parallel or co-planar with the base, to a second orientation, in which the bevel angle guide is perpendicular to the base;
wherein the bevel angle guide is positioned in the second portion of the opening in the base when in the first orientation; and
wherein the bevel angle guide includes a first scale and a second scale positioned, respectively, on orthogonal surfaces of the bevel angle guide, and wherein each of the first scale and the second scale indicate the bevel angle of the saw blade relative to the base.

2. The circular saw of claim 1, wherein the saw blade is rotatable about a rotational axis, and wherein the bent edge is oriented parallel with the rotational axis.

3. The circular saw of claim 1, wherein the base includes a front end and an opposite, rear end relative to a cutting direction of the saw blade, and wherein the bent edge is proximate and parallel with the front end of the base.

4. The circular saw of claim 1, wherein the bevel angle guide includes a straight edge and an adjacent arcuate edge, and wherein a portion of the second portion of the opening is defined by an arcuate edge on the base corresponding to a shape of the arcuate edge of the bevel angle guide.

5. The circular saw of claim 1, wherein the base includes a total area, and wherein the opening occupies between 35% and 55% of the total area of the base.

\* \* \* \* \*